United States Patent [19]

Morgan

[11] Patent Number: 4,887,525
[45] Date of Patent: Dec. 19, 1989

[54] APPARATUS FOR APPLYING SPROUT INHIBITOR TO STORED POTATOES

[76] Inventor: Charles R. Morgan, 4659 Enterprise St., Boise, Id. 83705

[21] Appl. No.: 281,982

[22] Filed: Dec. 9, 1988

Related U.S. Application Data

[62] Division of Ser. No. 193,051, May 12, 1988.

[51] Int. Cl.⁴ .............................................. A23B 7/00
[52] U.S. Cl. ...................................... 99/476; 99/516
[58] Field of Search .................. 99/467, 468, 473–476, 99/516, 534, 536; 426/321, 312, 419; 55/92, 236, 238; 261/DIG. 46, DIG. 65; 318/541, 806, 809

[56]  References Cited

U.S. PATENT DOCUMENTS

| | | | |
|---|---|---|---|
| 3,339,475 | 9/1967 | Martin | 99/476 X |
| 4,078,480 | 3/1978 | Luck | 99/516 |
| 4,200,657 | 4/1980 | Cook | 426/419 |
| 4,226,179 | 10/1980 | Sheldon, III et al. | 99/475 |
| 4,421,774 | 12/1983 | Vidal et al. | 426/319 |
| 4,479,079 | 10/1984 | Hanner | 318/541 X |
| 4,735,134 | 4/1988 | Brouwer | 99/476 |

Primary Examiner—Timothy F. Simone
Attorney, Agent, or Firm—Frank J. Dykas; Craig M. Korfanta

[57]  ABSTRACT

An apparatus for applying sprout inhibiting chemicals to stored potatoes using installed storage air system at a reduced air flow having frequency generator 24 serially connected between power supply control box 23 and fan motor 12 for air supply fan 11 to reduce the frequency of power supply to fan motor 12 in order to reduce the amount of air being delivered to stored potatoes 22 to less than 5 SCFM per ton of potatoes stored. By reducing air flow to less than 5 SCFM loss of sprout inhibiting chemical by agglomeration and impingement with the surfaces of the air handling system is substantially reduced.

2 Claims, 3 Drawing Sheets

APPARATUS FOR APPLYING SPROUT INHIBITOR TO STORED POTATOES

DIVISIONAL APPLICATION

This is a divisional application of application serial No. 07/193,051, filed 5/12/88.

DESCRIPTION

Background of the invention

1. Technical Field.

This invention relates to an apparatus for applying sprout inhibiting chemicals to stored potatoes.

2. Background Art.

Potatoes are usually harvested from the ground by the use of digging machines which lift the potatoes from under the ground and convey them up and into the bed of a truck traveling alongside of the harvester. Every attempt is made, both mechanically and by hand sorting, to separate the potatoes from clods of earth and rock. Once a truck is fully loaded, it is taken to a nearby storage where the potatoes are removed from the truck and piled within a storage building.

The potato tuber, when harvested, is a living organism in a nongrowth, or as it is more commonly called, a dormant state. But even in a dormant state it respirates and gives off heat at the rate, depending upon variety, of between 1000 BTU's to 1800 BTU's per ton, per day. The potatoes are piled into earthen floored storage buildings approximately 16' to 20' high, with a typical storage facility holding between 2,500 tone to 12,000 tons in a pile of potatoes which can be as large as 130' wide by 400' long and 20' high. Thus the heat given off by the dormant potatoes in storage is considerable, ranging from 2.5 million to 21.6 million BTU's per day. As a result the problem is not keeping the storage facility heated, but rather cooled on all but the coldest of winter days.

If the potatoes overheat, bacterial activity in the potato pile will rapidly increase causing rot or hot spots in the pile. If the potatoes are chilled below 40° F. the living potatoes will attempt to compensate by converting stored starch to sugar. If the moisture content of the air in the storage exceeds saturation for any given temperature, condensate will drip from the ceiling down into the pile of potatoes further enhancing bacterial activity. If the air is too dry, the potatoes will dehydrate which results in shrinkage of the total tonnage in storage.

The ideal storage parameters for a modern storage facility are 42° F. to 45° F. and 95%, but not saturated, relative humidity. In order to achieve this environment elaborate ventilation systems are incorporated into the storage facility to mix warm inside air with cooler outside air to maintain temperatures within the desired range. Humidification equipment is also provided, but is not relevant to invention at hand.

To get cooling air up through the pile of potatoes, ventilation pipes, having vent holes approximately 1¼ inches to 1⅜ inches in diameter are first laid on the earthen floor before the potatoes are piled into the storage facility. These ventilation pipes are connected to a air supply plenum and are deisgned to distribute a supply of air to the bottom of the potato pile. This air filters up through the loosely stacked potatoes and exits the top of the pile, thereby keeping the potatoes at the desired temperatures. The air discharged from the pile is then either exhausted to the outside, or returned by means of a return air plenum to the fan where it is usually mixed with cool outside air or, if the outside air is warmer than the inside air, it is directly cycled back into the supply plenum.

These types of storage facilities are well known in the art and are disclosed in LUCK, U.S. Pat. No. 4,078,480 and SHELDON, III, ET AL., U.S. Pat. No. 4,226,179.

It should also be mentioned that refrigerated systems are oftentimes incorporated into the design to cool the inside air if and when the outside air is too warm to serve as an effective source of cooling air. Refrigeration is usually found in storages located in warm climates, or in those storages designed to hold potatoes until later in the season, usually late spring. In any event, the invention described herein works equally well in both ventilation only and refrigeration storages.

Since the potato tuber is alive, albeit in a dormant or nongrowth state, at the time it is placed in the storage, its biological clock is ticking, and sometime before or during the spring it will begin to sprout. Once sprouting commences, the commercial value of the stored crop is substantially decreased. If the potatoes are to be removed from the storage facilities to processing early in the storage season no action to prevent sprouting is necessary. However if storage is planned to extend beyond January then action must be taken to inhibit sprouting. This is done by the use of chemicals.

Sprout inhibiting chemicals such as Isopropyl M-Chlorocarbanilate (CIPC) are typically used to inhibit sprouting. CIPC is an effective sprout inhibitor and is usually applied to the stored potatoes sometime between October and the beginning of February. CIPC is a difficult chemical to apply since it is a solid at normal temperatures, and secondly must be applied to potatoes in a storage facility which itself is at a remote location, oftentimes at the end of a unpaved country road. Also, this application must be accomplished during the winter months in inclement weather when it is difficult to keep portable engine power equipment working properly.

Two different apparatus and processes for applying CIPC are described in LUCK, U.S. Pat. No. 4,078,480 and SHELDON, III, ET AL., U.S. Pat. No. 4,226,179. However there are some general similarities common to all applications of CIPC. First, CIPC must be converted from its solid form to an aerosol capable of being deposited on the skins of the stored potatoes. The most common method is the use of a thermal fogger which heats the CIPC and a solvent solution to produce an aerosol type atomization or fog of CIPC which is then introduced into the air handling system. Such a device is described in the background art of SHELDON, III, ET AL., U.S. Pat. No. 4,226,179 as well as the ultrasonic device of SHELDON. In practice thermal fogging apparatus are the predominant method of atomizing CIPC, and temperatures in the 250° F. range can be maintained by use of propane as a fuel source.

The fog of CIPC is injected into the central air plenum of the storage facility, and is distributed throughout the storage facility by use of the air handling system of the storage facility. The fog of CIPC eventually makes its way down the ventilation pipes, out through the vent holes and filters up through the pile of potatoes, depositing CIPC on the potatoes in the process.

The problem is the CIPC is in an aerosol suspension with the air inside the storage and is subject to agglomeration and impingement with the surfaces of the air plenum, vent pipes, louvers and fan blades of the air handling system. As the particles of CIPC agglomerate they form droplets sufficiently large to fall out of suspension with the air or which impinge upon the surfaces of the air handling system, forming a coating of CIPC on the air handling equipment which resembles a powdery hoarfrost. This is a significant problem for a number of reasons. First, the CIPC hoarfrost can actually plug ventilation holes in the ventilation pipes; secondly, a significant amount of CIPC, up to 85%, is wasted, and finally, the residue must be cleaned off of the air handling system and that itself is a most unpleasant and time consuming task.

Normal air flow in a ventilated potato storage ranges from 10 to 30 SCFM per ton, where SCFM denotes standard cubic feet per minute, of potatoes in storage. If, for example, 12,000 tons of potatoes were in a particular storage, this results in an air flow in the central air plenum of up to 360,000 SCFM. That is a lot of air flow, and the result is an extremely fast and turbulent movement of air through the fans and the central air plenum.

Concentrations of CIPC as low as 3 ppm on the surface of a potato are sufficient to inhibit sprouting. The maximum concentration by Federal Regulation is 50 ppm. In practice, using current technologies, sufficient quantities of atomized CIPC must be introduced into the central air plenum to result in average residual concentrations of 17 to 20 ppm on the potatoes if all of it reached the potatoes instead of agglomerating and being deposited on the air handling system surfaces.

What is needed is an apparatus and method for reducing the agglomeration of CIPC and its precipitation and impingement with the surfaces of the air handling system. This is something that can be done by temporarily reducing both the air flow and the turbulence within the air handling system.

The use of a smaller, substitute air handling fan system is not practical because of the remote locations of the storages and the difficulty of finding or providing an adequate power source for a portable or temporary air handling system. As previously stated, the storage facilities are usually located at remote locations, where it is difficult to find or access suitable electric power, and the fact that the applications are made in the middle of winter, means that portable power sources such as gasoline and diesel engines are difficult to start and maintain.

Since the air handling system of the potato storage facility is already in place and operable, the ideal solution is to somehow temporarily reduce the air handling capacity of the installed air system. One method of reducing the air handling capacity of the installed system is to block off some of the air supply, or the cross-sectional area of the fan discharge by means of a temporary baffle. While this temporarily reduces the air handling capacity of the system, it does not solve the problem in that significant pressure differentials develop across the temporary baffles, which if in contact with air supply and discharge louvers, will damage them, and secondly baffles will actually enhance turbulent flow further aggravating the agglomeration and impingement problems in the immediate area around the baffles. This also increases the stresses on the fans and turbulence within the fan. And, it may overload and damage the fan motor.

A second solution, if multiple fans are used in the air handling system, is to disconnect some of the fans. But again, practical problems are encountered in that the fans are oftentimes suspended high above the floor and are not independently switched and as a result must be temporarily, electrically disconnected by an applicator who may not be a licensed electrician working in a hostile and difficult environment.

In practice it has been found that if air flow rates can be reduced to less than 5 SCFM per ton, and more desirably down to less than 2 SCFM per ton, the agglomeration, precipitation and impingement of CIPC against the surfaces of the air handling equipment will at the very least, be vastly reduced, and if the air flows are less than 2 SCFM, will not occur at all.

Accordingly, it is an object of this invention to provide an apparatus which temporarily reduces the air handling capacity of a potato storage facility to 5 SCFM or less per ton, and a method of introducing CIPC into the storage facility when the flow rate is so reduced.

DISCLOSURE OF INVENTION

These objects are accomplished by the use of a high power capacity, variable frequency, generator which is hooked in line between the standard 3 phase, 60 Hz, power supply source for the storage facility's ventilation fans to supply adequate power to the synchronous motors of the ventilation fans at a reduced frequency so as to cause the synchronous motors to run at reduced speeds thereby reducing the air flow through the fan from 10 to 30 SCFM per ton to less than 5 SCFM per ton.

BEST MODE FOR CARRYING OUT INVENTION

Figure 1:
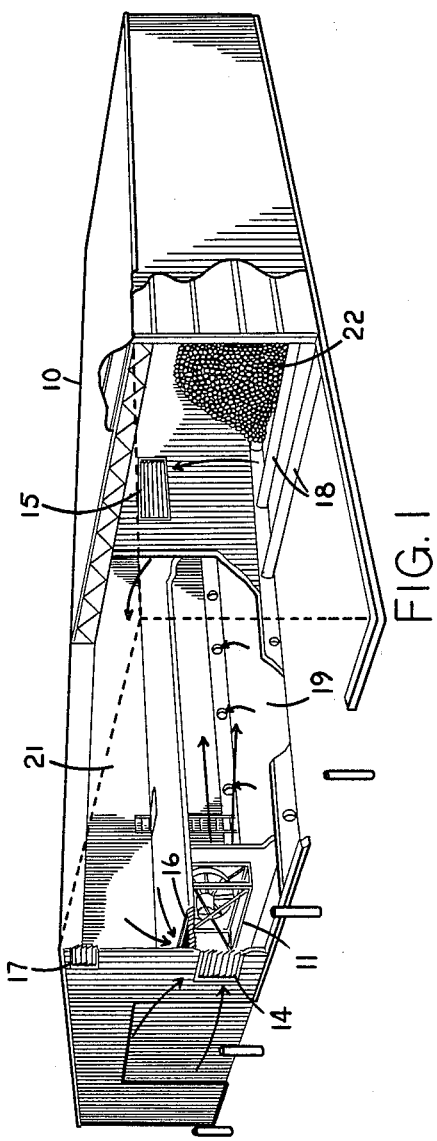
FIG. 1 is a representational view of a typical storage facility.
Figure 2:
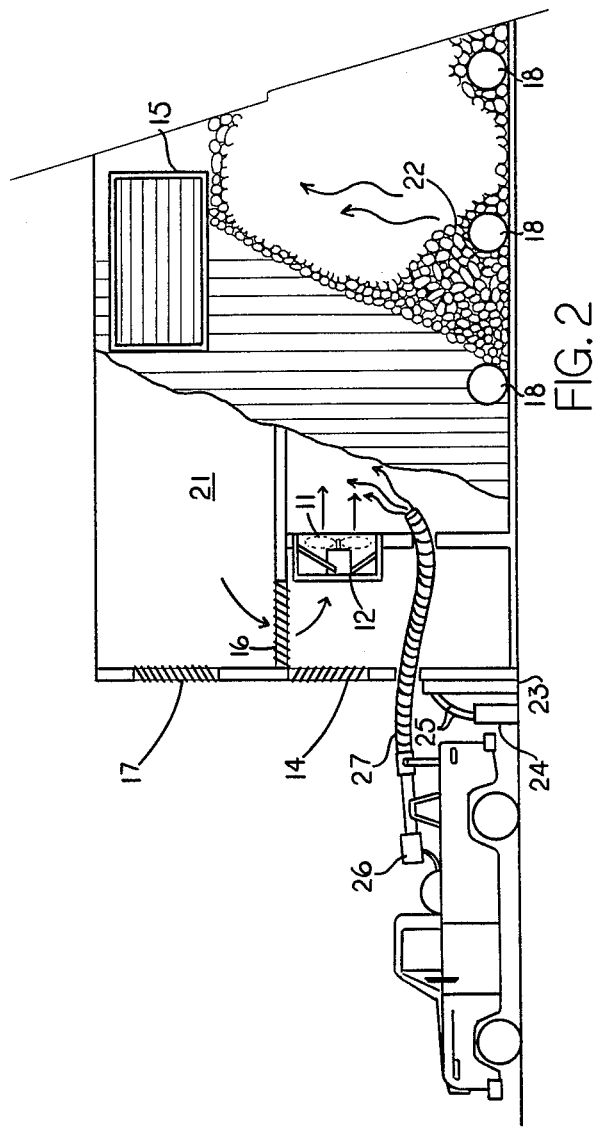
FIG. 2 is a sectional representational view of a air handling system for a potato storage facility with my new device installed.

A typical potato storage facility in use today, as shown in FIGS. 1 and 2, has building 10, central air supply plenum 19 and ventilation pipes 18 connected to air supply plenum 19 for distributing air across the bottom of the potato pile. Air passes up through vent holes, not shown, in ventilation pipes 18 and then filters up through the entire pile of potatoes 22. Air exiting from the top of the potato pile passes through plenum return louvre 15 into return air plenum 21 and is either recycled through mixing louvre 16 through fan blades 11 and back into air supply plenum 19, or exhausted to the outside atmosphere through exhaust louvre 17.

Temperature in the potato storage is regulated by the introduction of cooler air from the outside atmosphere through outside louvre 14, either as the exclusive source of air or mixed with warmer return air through mixing louvre 16.

Fan 11 is powered by fan motor 12, usually directly driven by connecting the propeller directly to the motor shaft. Typically motors 12 are three-phase 240 or 460 volt synchronous motors, supplied through electrical control box 23.

Figure 3:
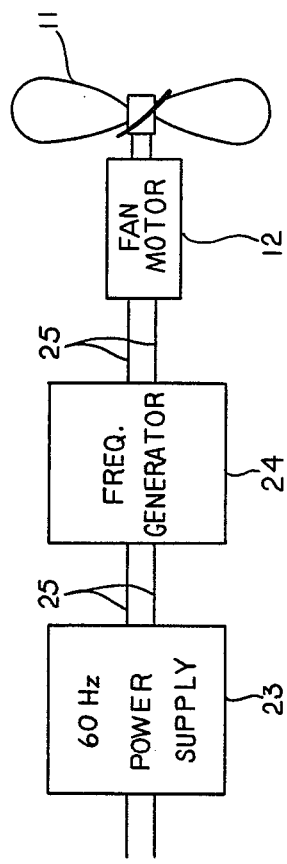
FIG. 3 is a block diagram of the electrical system utilizing my new device.

As can be seen in FIGS. 2 and 3, a frequency generator 24, utilizing jumper cables 25 is temporarily installed between the 60 cycle standard power supply control box 23 and the fan motor 12. Frequency generator 24 is then operated to reduce the frequency being supplied to fan motor 12 from 60 Hz to 15 to 25 Hz, depending upon the design of the particular air handling system. In this manner, air flow in the central air plenum is reduced from between 10 and 30 SCFM per ton of potatoes to less than 5 SCFM per ton of potatoes.

Once the air flow has been reduced thermal fogger 26 is used to create an aerosol fog of CIPC which is then introduced into the air supply plenum through pipe 27.

In practice it has been found that the agglomeration of CIPC is substantially reduced at air flows of less than 5 SCFM per ton and that this results in a substantial elimination of the hoarfrost like residue of CIPC being deposited upon the surfaces of the air handling system. Further, it has been found in practice that instead of having 85% of the CIPC which is introduced into the storage facility deposited upon the air handling system surfaces, virtually all of it with the exception of very minor concentrations of CIPC dust on the floor, is instead injected into the potato pile.

This produces a number of advantageous results. The first is that the agglomeration of CIPC is substantially reduced and the resulting smaller particles of CIPC entrained in air, can filter up through the pile more easily, thus resulting in a more uniform concentrations of CIPC on the potatoes. Secondly, there is no formation of hoarfrost residue on the air handling system surfaces, thus eliminating most of the cleanup work found after applications of CIPC using the air handling system without first reducing air flow and turbulence. Both of these represent significant increase in the efficiency of the use of the chemicals, and decreasing the requirement for multiple treatments.

Other advantages include the elimination of hoarfrost residue of CIPC which can actually plug the ventilation holes found in vent pipes 18. If a significant number of vent holes become plugged with this CIPC residue, it is possible to develop a hot spot in the potato pile. Without air flow, the potatoes 22 will heat up and will provide an excellent environment for bacterial activity and resulting rot. If this occurs several feet down in the pile and toward the back of the storage, the farmer will then have a choice of either removing the potatoes from storage early, or losing the crop. A final advantage is the elimination of the need to apply much higher concentrations than necessary, such as is required by conventional application techniques. Under the old methods, applying excess CIPC makes it possible to have uneven distribution of CIPC to the extent that the potatoes 22 in certain sections of the potato pile will contain excessively high residual amounts of CIPC, and if in excess of 50 PPM, will result in exceeding FDA limits for human consumption.

While there is shown and described the present preferred embodiment of the invention, it is to be distinctly understood that this invention is not limited thereto but may be variously embodied to practice within the scope of the following claims.

I claim:

1. In a potato storage facility having an air supply plenum, a fan and a fan motor, an apparatus for applying a sprout inhibiting chemical to the stored potatoes which comprises:
    means for reducing turbulence and the air flow in the air supply plenum below 5 standard cubic feet per minute per ton of potatoes stored therein;
    means for atomizing a sprout inhibiting chemical;
    means for introducing the atomized chemical into the air supply plenum of the potato storage facility.

2. The apparatus of claim No. 1 wherein the means for reducing the air flow in the air supply plenum is a frequency generator serially connected between the power supply for the fan motor and the fan motor.

* * * * *